United States Patent

Richter et al.

[11] 3,869,471
[45] Mar. 4, 1975

[54] ALPHA-THIOCYANOACETAMIDES
[75] Inventors: Sidney B. Richter, Chicago; Alfred A. Levine, Skokie, both of Ill.
[73] Assignee: Velsicol Chemical Corporation, Chicago, Ill.
[22] Filed: Aug. 28, 1972
[21] Appl. No.: 284,295

Related U.S. Application Data
[60] Division of Ser. No. 165,348, July 22, 1971, Pat. No. 3,723,439, Continuation-in-part of Ser. No. 732,822, May 29, 1969, abandoned.

[52] U.S. Cl. .................................... 260/326.11 R
[51] Int. Cl. .......................................... C07d 27/38
[58] Field of Search .............................. 260/326.11

[56] References Cited
UNITED STATES PATENTS
3,671,214 6/1972 Alt ........................................ 71/95

Primary Examiner—Joseph A. Narcavage
Attorney, Agent, or Firm—Robert J. Schwarz; Dietmar Olesch

[57] ABSTRACT
New chemical compositions of the formula

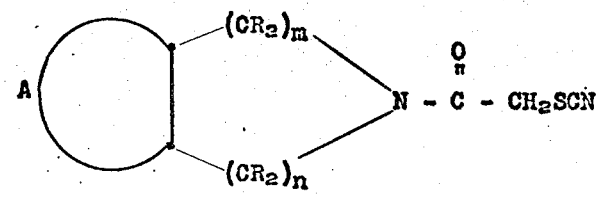

wherein each R is selected from the group consisting of hydrogen and alkyl; A forms a substituted or unsubstituted hydrocarbon ring of six carbon atoms wherein the substituents are selected from the group consisting of alkyl, alkenyl, halogen, haloalkyl, alkoxy, nitro, and dialkylamino; $m$ is an integer from 1 to 3; $n$ is an integer from 0 to 1; and $m + n$ is an integer from 2 to 3. A fungicidal composition comprising an inert carrier and, as an essential active ingredient, in a quantity toxic to fungi, a compound of the above description. A method for the control of fungi which comprises applying to said fungi a fungicidal composition comprising an inert carrier and, in a quantity toxic to fungi a compound heretofore described.

2 Claims, No Drawings

ALPHA-THIOCYANOACETAMIDES

This division, of application Ser. No. 165,348, filed July 22, 1971, now U.S. Pat. No. 3,723,439. This application is a continuation-in-part of our copending patent application Serial No. 732,822, filed May 29, 1968.

This invention relates to new chemical compositions of matter. More particularly this invention relates to new pesticidally active heterocyclic compounds of the formula

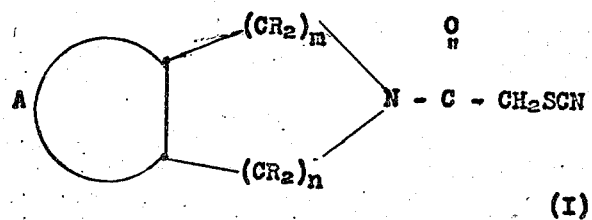

(I)

wherein each R is selected from the group consisting of hydrogen and alkyl; A forms a substituted or unsubstituted hydrocarbon ring of six carbon atoms wherein the substituents are selected from the group consisting of alkyl, alkenyl, halogen, haloalkyl, alkoxy, nitro and dialkylamino; $m$ is an integer from 1 to 3; $n$ is an integer from 0 to 1; and $m+n$ is an integer from 2 to 3.

In a preferred embodiment of this invention each R is selected from the group consisting of hydrogen and lower alkyl; A forms a substituted or unsubstituted hydrocarbon ring having a maximum of four substituents wherein the substituents are selected from the group consisting of lower alkyl, lower alkenyl, chlorine, bromine, lower chloroalkyl, lower bromoalkyl and lower fluoroalkyl, lower alkoxy, nitro and di(lower alkyl) amino. The term lower, as used herein, designates a straight or branched carbon chain containing a maximum of 5 carbon atoms.

Exemplary of compounds within the scope of the present invention which are of particular interest are compounds having the following structural formulas:

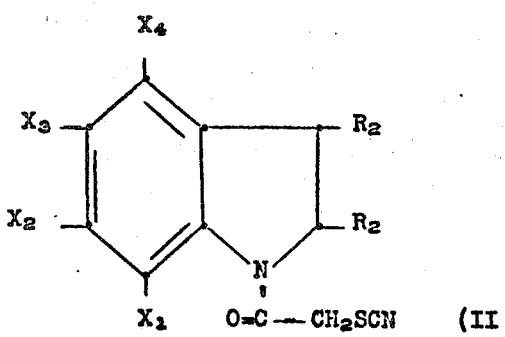

(II)

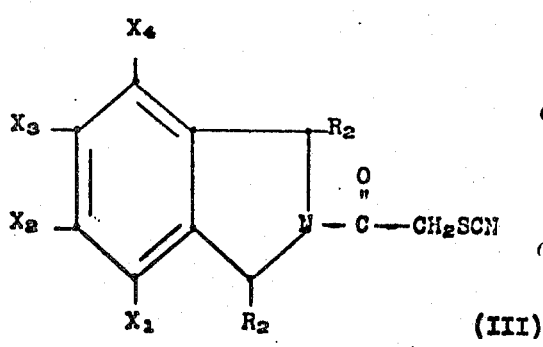

(III)

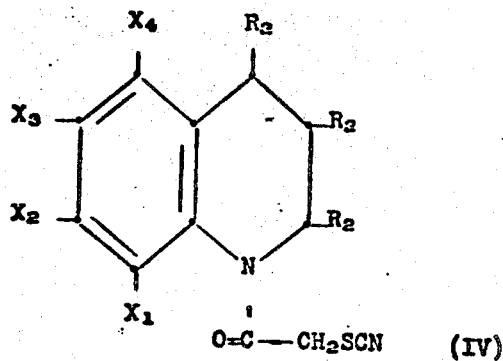

(IV)

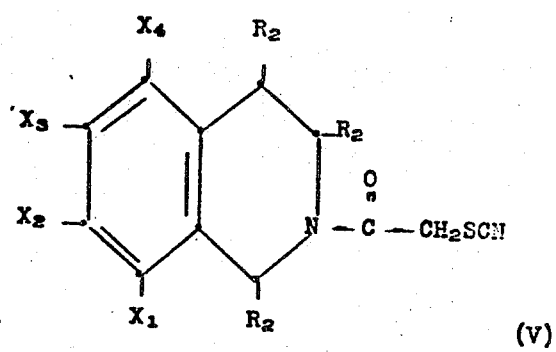

(V)

wherein $X_1$, $X_2$, $X_3$ and $X_4$ are independently selected from the group consisting of hydrogen, alkyl, alkenyl, halogen, haloalkyl, alkoxy, nitro and dialkylamino, and R is as heretofore described.

The compounds of the present invention are unexpectedly useful as pesticides and particularly as fungicides.

The new compounds of the present invention can be prepared from compounds having the following formula

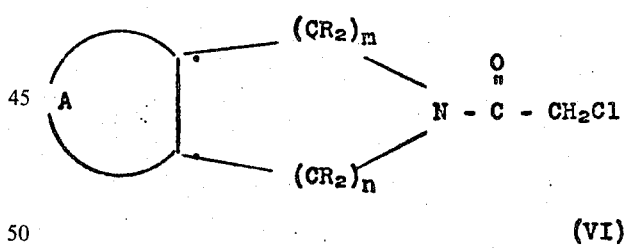

(VI)

wherein R, A, $m$ and $n$ are as heretofore described, by reaction with sodium thiocyanate or potassium thiocyanate. This reaction can be readily effected by combining a compound of Formula VI with a described thiocyanate in an inert organic solvent such as ethanol. This reaction usually requires heating and often reflux temperatures of the reaction mixtures are desirable. To recover the desired product after completion of the reaction, the reaction mixture can be first filtered to remove any inorganic salts which have formed and then stripped of solvent by evaporation, distillation or the like. The resulting product can be used as such or can be further purified if desired by washing, triturating, crystallization and the like if the product is a solid or if the product is a liquid by extraction, distillation, chromatography or other common techniques employed in the art.

Exemplary of the compound of Formula II which are suitable for preparing the new compounds of the present invention are 1-(α-chloroacetyl)indoline, 2-(α-chloroacetyl)-isoindoline, 2-(αchloroacetyl)-1,2,3,4-tetrahydroisoquinoline, 2-(αchloroacetyl)-1,2,3,4-tetrahydroisoquinoline, 1-(α-chloroacetyl)-4-chloroindoline, 1-(α-chloroacetyl)-3-methylindoline, 1-(α-chloroacetyl)-2-methyl-5-nitroindoline, 1-(α-chloroacetyl)-5-nitroindoline, 1-(α-chloroacetyl)-7-bromo-5-nitroindoline, 1-(α-chloroacetyl)-6-methoxyindoline, 2-(α-chloroacetyl)-1-methylisoindoline, 2-(α-chloroacetyl)-1-methyl-1,2,3,4-tetrahydroisoquinoline, 1-(α-chloroacetyl)-6-methoxy-1,2,3,4-tetrahydroquinoline, 1-(α-chloroacetyl)-6,8-dimethyl-1,2,3,4-tetrahydroquinoline, 2-(α-chloroacetyl)-7-nitro-1,2,3,4-tetrahydroisoquinoline, 1-(α-chloroacetyl)-decahydroquinoline, 1-(α-chloroacetyl)-3a, 4,7,7a-tetrahydroindoline, 1-(α-chloroacetyl)-2-methyl-hexahydroindoline and the like.

The compounds of Formula VI can be prepared from compounds of the following formula

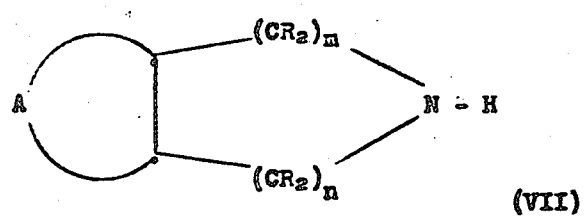

(VII)

wherein R, A, m and n are as heretofore described, by reaction with chloroacetyl chloride. This reaction can be readily effected by adding the chloroacetyl chloride to a solution of a compound of Formula VII in a suitable inert organic solvent such as benzene. In many instances this reaction is exothermic and cooling of the reaction mixture or a slow controlled addition of the chloroacetyl chloride can be desirable. The presence of an acid scavenger such as a tertiary in the reaction medium is preferred in order to remove the hydrogen chloride which is formed. After the completion of the reaction the desired product can be recovered by first filtering the reaction mixture to remove any insolubles which have formed such as amine hydrochloride when a tertiary amine is used as an acid scavenger, and thereafter evaporating the solvent used. The remaining product can then be used as such or can be further purified by distillation if a liquid or by recrystallization if a solid.

Exemplary compounds of Formula VII suitable for preparing the compounds of Formula VI are indoline, isoindoline, 1,2,3,4-tetrahydroquinoline, 1,2,3,4-tetrahydroisoquinoline, 4-chloroindoline, 3-methylindoline, 2-methyl-5-nitroindoline, 7-bromo-5-nitroindoline, 2,3-dimethylindoline, 4-methoxyindoline, 6-methoxyindoline, 6-ethyl-2,3-dimethylindoline, 1-methylisoindoline, 1-butylisoindoline, 1-methyl-1,2,3,4-tetrahydroisoquinoline, 5-methoxy-1,2,3,4-tetrahydroisoquinoline, 3-methyl-1,2,3,4-tetrahydroquinoline, 6-methyl-1,2,3,4-tetrahydroquinoline, 6,8-dimethyl-1,2,3,4-tetrahydroquinoline, 6-methoxy-1,2,3,4-tetrahydroquinoline, 7-nitro-1,2,3,4-tetrahydroisoquinoline, 1-methyl-5-nitro-1,2,3,4-tetrahydroisoquinoline, 4,5-dihydroindoline, 5,6-dihydroindoline, 3a,4,7,7a-tetrahydroindoline, hexahydroindoline, 3a,4,7,7a-tetrahydroisoindoline, 3a,4,5,6-tetrahydroisoindoline, hexahydroisoindoline, 1,2,3,4,5,8-hexahydroisoquinoline, 1,2,3,4,5,6,7,8-octahydroisoquinoline, 1,2,3,4,5,8-hexahydro-6-methoxyisoquinoline, 1-methyldecahydroisoquinoline, 1,2,3,4,4a,5,6,7-octahydroquinoline, 1,2,3,4,5,6,7,8-octahydroquinoline and the like.

The manner in which the compounds of the present invention can be prepared readily is further illustrated in the following examples:

EXAMPLE 1

Preparation of 1-(α-Thiocyanoacetyl)Indoline 1-(α-Chloroacetyl)indoline (19.6 grams; 0.1 mol), potassium thiocyanate (18 grams; 0.2 mol) and ethanol (100 ml.) were charged into a glass reaction flask equipped with stirrer and reflux condenser. The reaction mixture was heated at reflux for a period of about 4 hours. After this time the mixture was cooled and filtered. The filtrate was evaporated under reduced pressure to yield a brown solid as a residue. The residue was washed with water and dried. The dried product was then recrystallized from a benzene-pentane mixture to yield 1-(α-thiocyanoacetyl)indoline having a melting point of 125° to 127° C. and having the following elemental analysis as calculated for $C_{11}H_{10}N_2OS$

|  |  | C | H | N | S |
|---|---|---|---|---|---|
| Theoretical | %: | 60.58 | 4.62 | 12.84 | 14.69 |
| Found | %: | 61.07 | 4.64 | 12.71 | 14.32 |

EXAMPLE 2

Preparation of 2-(α-Chloroacetyl)Isoindoline

A solution of isoindoline (60 grams; 0.5 mol) and triethylamine (50 grams) in benzene (1000 ml) is placed in a glass reaction flask equipped with mechanical stirrer and reflux condenser. Chloroacetyl chloride (56.5 grams; 0.5 mol) is slowly added with stirring, over a period of about 20 minutes. The mixture is stirred for an additional period of about 30 minutes and is then filtered. The filtrate is then stripped of benzene to yield 2-(α-chloroacetyl)isoindoline.

EXAMPLE 3

Preparation of 2-(α-Thiocyanoacetyl)Isoindoline 2-(α-Chloroacetyl)isoindoline (19.6 grams; 0.1 mol), potassium thiocyanate (18 grams; 0.2 mol) and ethanol (100 ml.) are charged into a glass reaction flask equipped with stirrer and reflux condenser. The reaction mixture is heated at reflux for a period of about 4 hours. After this time the mixture is cooled and filtered. The filtrate is stripped of solvent under reduced pressure and the resulting residue is washed with water, dried and is recrystallized to yield 2-(α-thiocyanocetyl)isoindoline.

EXAMPLE 4

Preparation of
1-(α-Chloroacetyl)-1,2,3,4-tetrahydroquinoline

A solution of 1,2,3,4-tetrahydroquinoline (66.5 grams; 0.5 mol) and triethylamine (50 grams) in benzene (1000 ml) was placed in a glass reaction flask equipped with mechanical stirrer and reflux condenser. Chloroacetyl chloride (56.5 grams; 0.5 mol) was slowly added with stirring over a period of about 15 minutes. An exotherm was observed. The mixture was then stirred for an additional period of about 15 minutes, was cooled and then filtered. The filtered benzene solution was then stripped of solvent resulting in a dark colored oil. The oil was distilled under reduced pressure to yield 1-(α-chloroacetyl)-1,2,3,4-tetrahydroquinoline as a yellow oil having a boiling point of 170° to 173° C. at 3.5 mm of Hg pressure and a refractive index of 1.5865 at 25° C.

EXAMPLE 5

Preparation of
1-(α-Thiocyanoacetyl)-1,2,3,4-tetrahydroquinoline 1-(α-Chloroacetyl)-1,2,3,4-tetrahydroquinoline (20.9 grams; 0.1 mol), potassium thiocyanate (18 grams; 0.2 mol) ethanol (100 ml.) and a few crystals of sodium iodide were charged into a glass reaction vessel equipped with a mechanical stirrer and reflux condenser. The reaction mixture was heated at reflux for a period of about 7 hours. After this time the mixture was cooled and filtered. The filtrate was poured into cold water resulting in the formation of a white solid. The solid was dissolved in ether and the ethereal solution dried over anhydrous magnesium sulfate and filtered. The dried solution was then stripped of ether to yield a yellow solid. The solid was dried in vacuo and recrystallized from ether to yield 1-(α-thiocyanoacetyl-1,2,3,4-tetrahydroquinoline having a melting point of 73°–74.5° C. and having the following elemental analysis as calculated for $C_{12}H_{12}N_2OS$

|  | C | H | N | S |
|---|---|---|---|---|
| Theoretical %: | 62.04 | 5.21 | 12.06 | 13.80 |
| Found %: | 62.00 | 5.11 | 12.01 | 13.70 |

EXAMPLE 6

Preparation of
2-(α-Chloroacetyl)-1,2,3,4-tetrahydroisoquinoline

A solution of 1,2,3,4-tetrahydroisoquinoline (66.5 grams; 0.5 mol) and triethylamine (50 grams; 0.5 mol) in benzene (1.1) was charged into a glass reaction vessel equipped with a stirrer, reflux condenser and addition funnel. Chloroacetyl chloride (56.5 grams; 0.5 mol) was slowly added over a period of about 15 minutes. An exotherm was observed. Stirring was continued for an additional 15 minutes after which the reaction mixture was cooled and filtered. The filtrate was stripped of benzene under reduced pressure resulting in a dark colored oil as a residue. The dark oil was distilled in vacuo to yield 2-(α-chloroacetyl)-1,2,3,4-tetrahydroisoquinoline as a yellow oil having a boiling point of 190° to 195° C. at 7 mm of Hg pressure, and an index of refraction at 27° C. of 1.5813.

EXAMPLE 7

Preparation of
2-(α-Thiocyanoacetyl)-1,2,3,4-tetrahydroisoquinoline 2-(α-Chloroacetyl)-1,2,3,4-tetrahydroisoquinoline (13 grams; 0.06 mol), potassium thiocyanate (11 grams), ethanol (100 ml.) and a few crystals of sodium iodide were charged into a glass reaction flask equipped with stirrer and reflux condenser. The reaction mixture was heated, with stirring, for a period of about 2 hours. After this time the reaction mixture was cooled and filtered. The filtrate was poured into 1600 ml. of cold water resulting in the formation of an oil. The oil solidified upon standing. The solid was recovered by filtration and dissolved in ether. The ethereal solution was dried over anhydrous magnesium sulfate, was filtered and evaporated to yield a yellow solid. The solid was recrystallized from ether to yield 2-(α-thiocyano)-1,2,3,4-tetrahydroisoquinoline having a melting point of 73° to 74° C. and having the following elemental analysis as calculated for $C_{12}H_{12}N_2OS$:

|  | C | H | N | S |
|---|---|---|---|---|
| Theoretical %: | 62.04 | 5.21 | 12.06 | 13.80 |
| Found %: | 61.56 | 5.11 | 12.00 | 13.20 |

EXAMPLE 8

Preparation of 1-(α-Chloroacetyl)-4-chloroindoline

A solution of 4-chloroindoline (77 grams; 0.5 mol) and triethylamine (50 grams) in benzene (1000 ml.) is placed in a glass reaction flask equipped with mechanical stirrer and reflux condenser. Chloroacetyl chloride (56.5 grams; 0.5 mol) is slowly added, with stirring, over a period of about 20 minutes. The mixture is stirred for an additional period of about 30 minutes and is then filtered. The filtrate is then stripped of benzene to leave an oil as a residue. The oil is distilled under reduced pressure to yield 1-(α-chloroacetyl)-4-chloroindoline.

EXAMPLE 9

Preparation of
1-(α-Thiocyanoacetyl)-4-chloroindoline 1-(α-Chloroacetyl)-4-chloroindoline (23 grams; 0.1 mol) potassium thiocyanate (18 grams; 0.2 mol), ethanol (100 ml.) and a few crystals of sodium iodide are charged into a glass reaction flask equipped with a mechanical stirrer and reflux condenser. The reaction mixture is heated at reflux for a period of about 4 hours. After this time the reaction mixture is cooled and filtered. The filtrate is stripped of solvent under reduced pressure and the resulting residue is washed with water, dried and is recrystallized to yield 1-(α-thiocyanoacetyl)-4-chloroindoline.

EXAMPLE 10

Preparation of
1-(α-Chloroacetyl)-6,8-dimethyl-1,2,3,4-tetrahydroquinoline

A solution of 6,8-dimethyl-1,2,3,4- tetrahydroquinoline (84 grams; 0.5 mol) and triethylamine (50 grams) in benzene (100 ml) is placed in a glass reaction flask equipped with stirrer, reflux condenser and addition funnel. Chloroacetyl chloride (56.5 grams; 0.5 mol) is slowly added, with stirring over a period of about 30 minutes. The mixture is stirred for an additional period of about 30 minutes and is then filtered. The filtrate is stripped of benzene to yield 1-(α-chloroacetyl)-6,8-dimethyl-1,2,3,4-tetrahydroquinoline as a residue.

EXAMPLE 11

Preparation of
1-(α-Thiocyanoacetyl)-6,8-dimethyl-1,2,3,4-tetrahydroquinoline 1-(α-chloroacetyl)-6,8-dimethyl-1,2,3,4-tetrahydroquinoline (24 grams; 0.1 mol), potassium thiocyanate (18 grams; 0.2 mol), ethanol (1000 ml.) and a few crystals of sodium iodide are charged into a glass reaction flask equipped with a mechanical stirrer and reflux condenser. The reaction mixture is heated at reflux for a period of about 5 hours. After this time the reaction mixture is cooled and filtered. The filtrate is stripped of solvent and the resulting residue is washed with water and is then recrystallized to yield 1-(α-thiocyanoacetyl)-6,8-dimethyl-1,2,3,4-tetrahydroquinoline.

EXAMPLE 12

Preparation of 1-(α-Chloroacetyl) Decahydroquinoline

A solution of decahydroquinoline (21 grams; 0.15 mol) and a triethylamine (15 grams) in benzene (250 ml.) was charged into a 500 ml glass reaction flask equipped with mechanical stirrer, reflux condenser and addition funnel. Chloroacetyl chloride (18 grams; 0.15 mol) was slowly added, with stirring, over a period of about 10 minutes. After the addition was completed stirring was continued for a period of about 15 minutes. After this time the reaction mixture was filtered to remove the triethylamine hydrochloride which had formed. The filtered solution was then washed twice with 250 ml portions of dilute hydrochloric acid and then with water, and thereafter dried over anhydrous magnesium sulfate. The dried solution was filtered and stripped of benzene under reduced pressure to yield an oil. The oil, was distilled twice under reduced pressure to yield 1-(α-chloroacetyl) decahydroquinoline as a yellow oil having a boiling point of 143° to 146° C. at 0.3 mm Hg pressure, a refractive index of 1.5212 at 25° C. and having the following elemental analysis as calculated for $C_{11}H_{18}ClNO$:

|  | C | H | Cl | N |
|---|---|---|---|---|
| Theoretical, %: | 61.24 | 8.41 | 16.44 | 6.49 |
| Found, %: | 60.95 | 8.46 | 16.49 | 6.48 |

EXAMPLE 13

Preparation of 1-(α-Thiocyanoacetyl) Decahydroquinoline 1-(α-Chloroacetyl) decahydroquinoline (5 grams; 0.023 mol), potassium thiocyanate (4.2 grams; 0.05 mol) and ethanol (50 ml) were charged into a glass reaction flask equipped with mechanical stirrer and reflux condenser. The reaction mixture was stirred at reflux, with stirring, for a period of about 2 hours. After this time, the reaction mixture was cooled, filtered and poured into a large volume of cold water to yield an oil. The oil was extracted with ether and the ethereal solution was washed with water and dried over anhydrous magnesium sulfate. The dried solution was filtered and stripped of solvent on a steam bath to yield a dark oil. The oil was allowed to stand whereupon it solidified. The solid was then ground and dried in vacuo to yield 2.8 grams of product. The product was recrystallized from hexane and was dried in an Abderholden Apparatus to yield 1-(α-thiocyanoacetyl) decahydroquinoline having a melting point of 200° to 202° C. and having the following elemental analysis as calculated for $C_{12}H_{18}N_2OS$:

|  | C | H | N | S |
|---|---|---|---|---|
| Theoretical, %: | 60.46 | 7.61 | 11.76 | 13.45 |
| Found, %: | 61.14 | 7.98 | 11.87 | 13.21 |

Other compounds within the scope of this invention can be prepared by the procedures described in the foregoing examples. Presented in the following examples are the essential ingredients required to prepare the indicated named compounds according to the procedures heretofore described.

EXAMPLE 14

3-Methylindolene +chloroacetyl chloride +potassium thiocyanate =1-(α-thiocyanoacetyl)-3-methylindolene.

EXAMPLE 15

2-Methyl-5-nitroindolene +chloroacetyl chloride +potassium thiocyanate =1-(α-thiocyanoacetyl)-2-methyl-5-nitroindolene.

EXAMPLE 16

4-Methoxyindolene +chloroacetyl chloride +potassium thiocyanate =1-(α-thiocyanoacetyl)-4-methoxyindolene.

EXAMPLE 17

1-Methyl-1,2,3,4-tetrahydroisoquinoline +chloroacetyl chloride +potassium thiocyanate =2-(α-thiocyanoacetyl)-1-methyl-1,2,3,4-tetrahydroisoquinoline.

EXAMPLE 18

6-Methoxy-1,2,3,4-tetrahydroquinoline +chloroacetyl chlorides +potassium thiocyanate =1-(α-thiocyanoacetyl)-6-methoxy-1,2,3,4-tetrahydroquinoline.

EXAMPLE 19

7-Nitro-1,2,3,4-tetrahydroisoquinoline +chloroacetyl chloride +potassium thiocyanate =2-(α-thiocyanoacetyl)-7-nitro-1,2,3,4-tetrahydroisquinoline.

EXAMPLE 20

4,5-Dihydroindoline +chloroacetyl chloride +potassium thiocyanate =1-(α-thiocyanoacetyl)-4,5-dihydroindoline.

EXAMPLE 21

3a,4,7,7a-Tetrahydroindoline +chloroacetyl chloride +potassium thiocyanate =1-(α-thiocyanoacetyl)-3a,4,7,7a-tetrahydroindoline.

EXAMPLE 22

Hexahydroisoindoline +chloroacetyl chloride +potassium thiocyanate =2-(α-thiocyanoacetyl)hexahydroisoindoline.

EXAMPLE 23

1,2,3,4,4a,5,6,7-Octahydroquinoline +chloroacetyl chloride +potassium thiocyanate =1-(α-thiocyanoacetyl)-1,2,3,4,4a,5,6,7-octahydroquinoline.

EXAMPLE 24

1,2,3,4,5,8-Hexahydroisoquinoline +chloroacetyl chloride +potassium thiocyanate =2-(α-thiocyanoacetyl)-1,2,3,4,5,8-hexahydroisoquinoline.

EXAMPLE 25

1,2,3,4,5,8-Hexahydro-6-methoxyisoquinoline +chloroacetyl chloride +potassium thiocyanate =2-(α-thiocyanoacetyl)-1,2,3,4,5,8-hexahydro-6-methoxyisoquinoline.

EXAMPLE 26

1,2,3,4-Tetrahydro-6-dimethylaminoquinoline +chloroacetyl chloride +potassium thiocyanate =1-(α-thiocyanoacetyl)-1,2,3,4-tetrahydro-6-dimethylaminoquinoline.

The new compounds of this invention are fungicidal in their ability to kill, inhibit, or inactivate a fungus so that it does not grow. Practically, these compounds can be used to prevent fungi and molds from harming cloth, wood, plants, seeds, fruit, animals, or whatever else they attack. The fungicidal compounds should preferably be applied before the infection has occurred and certainly before it has progressed very far.

For practical use as fungicides, the compounds of this invention are generally incorporated into fungicidal compositions which comprise an inert carrier and a fungicidally toxic amount of such a compound. Such fungicidal compositions, which are usually known in the art as formulations, enable the active compound to be applied conveniently to the site of the fungus infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of fungicides can be dispersed under superatmospheric pressure as aerosols. However, preferred liquid fungicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the fungus infestation. The emulsifiers most commonly used in these concentrates are nonionic or mixtures of nonionic with anionic surface-active agents.

A typical fungicidal composition according to this invention is illustrated by the following example, in which the quantities are in parts by weight.

Example 27

| Preparation of a Dust | |
|---|---|
| Product of Example 1 | 10 |
| Powdered talc | 90 |

The above ingredients are mixed in a mechanical grinder-blender and are ground until a homogeneous, free-flowing dust of the desired particle size is obtained. This dust is suitable for direct application to the site of the fungus infestation.

The fungicides of this invention can be applied in any manner recognized by the art. The concentration of the new compounds of this invention in the fungicidal compositions will vary greatly with the type of formulation and the purpose for which it is designed, but generally the fungicidal compositions will comprise from about 0.5 to about 95 percent by weight of the active compounds of this invention. In a preferred embodiment of this invention, the fungicidal compositions will comprise from about 5 to about 75 percent by weight of the active compound. The compositions can also comprise such additional substances as other pesticides, spreaders, adhesives, stickers, fertilizers, activators, synergists, and the like.

The compounds of the present invention are also useful when combined with other fungicides in the fungicidal compositions heretofore described. The other fungicides can comprise from about 5 percent to about 95 percent of the active ingredients in the fungicidal compositions. Use of combinations of these other fungicides with the compounds of the present invention provides fungicidal compositions which are more effective in controlling fungi and often provide results unattainable with separate compositions of the individual fungicides. The other fungicides, with which the compounds of this invention can be used in the fungicidal compositions to control fungi, can include fungicides such as 2-aminobutane, bordeaux mixture, ammonium dimethyl dithiocarbamate, benzoyl trimethyl ammonium bromide, cadmium sulfate, captan, chloranil, copper sulfate, cycloheximide, dichlone, 2,4-dichloro-6-(2-chloroanilino)-s-triazine, DDT, dichloran, p-dimethylaminobenzenediazo sodium sulfonate, dinocap, diphenylmercuri 8-hydroxyquinolinate, dodine, ethylmercuric chloride, ferbam, folpet, gliodin, maneb, metham, mezineb, nabam, pentachloronitrobenzene, PMA, phenylmercuric urea, streptomicin, thiram, zineb, ziram, difolatan, PCNB, and the like.

Such fungicides can also be used in the methods and compositions of this invention in the form of their esters, amides, and other derivatives whenever applicable to the particular parent compound.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compounds of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The fungicidal utility of the compounds of this invention was illustrated in an experiment carried out for the control of fusarium wilt (*Fusarium oxysporum*). In this experiment soil was inoculated with the fungus organism which was growing on wheat lima bean medium for 14 days. The inoculated soil was placed in one ounce paper cups, and the surface drenched with the test chemical, formulated as an aqueous emulsion of an acetone solution, at the indicated rates per four inch acre. After two to four days, the growth of the fungus was measured and rated in comparison with untreated controls. The results of this experiment are presented below:

| Test Compound | Rate, lbs per 4 inch acre | Control % |
| --- | --- | --- |
| 1-(α-Thiocyanoacetyl)-indolene | 100 | 100 |
| do. | 40 | 90 |

We claim:
1. A compound of the formula

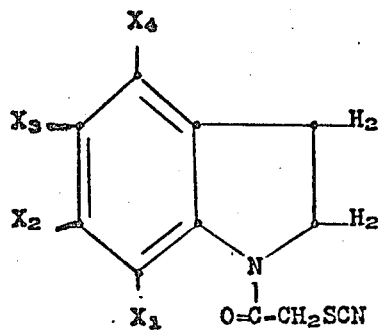

wherein $X_1$, $X_2$, $X_3$ and $X_4$ are independently selected from the group consisting of hydrogen, lower alkyl, chlorine, bromine, trifluoromethyl, lower alkoxy and nitro provided that only one of $X_1$, $X_2$, $X_3$ and $X_4$ is nitro or tertiary lower alkyl and that at least two of $X_1$, $X_2$, $X_3$ and $X_4$ are hydrogen.

2. The compound of claim 1, 1-(α-thiocyanoacetyl)indoline.

* * * * *